United States Patent
Rasheed et al.

(10) Patent No.: US 9,579,725 B2
(45) Date of Patent: *Feb. 28, 2017

(54) METHOD FOR PRODUCING METAL POWDERS

(71) Applicant: METALYSIS LIMITED, Rotherham (GB)

(72) Inventors: Raymond Kevin Rasheed, Sheffield (GB); Ian Margerison, West Yorkshire (GB)

(73) Assignee: METALYSIS LIMITED (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,426

(22) Filed: Feb. 19, 2014

(65) Prior Publication Data

US 2014/0165785 A1    Jun. 19, 2014

Related U.S. Application Data

(62) Division of application No. 13/201,135, filed as application No. PCT/GB2010/000266 on Feb. 15, 2010.

(30) Foreign Application Priority Data

Feb. 13, 2009   (GB) .................................. 0902486.0

(51) Int. Cl.
*C22B 34/24*      (2006.01)
*C25C 3/34*       (2006.01)
*C25C 3/04*       (2006.01)
*B22F 9/18*       (2006.01)
*B22F 9/20*       (2006.01)
(Continued)

(52) U.S. Cl.
CPC .................. *B22F 9/18* (2013.01); *B22F 9/20* (2013.01); *C22B 5/02* (2013.01); *C22B 34/129* (2013.01); *C22B 34/24* (2013.01); *C25C 3/26* (2013.01); *C25C 3/34* (2013.01); *C25C 5/04* (2013.01); *H01G 9/0525* (2013.01)

(58) Field of Classification Search
CPC .... C25C 5/04; C25C 3/26; C25C 3/34; C22B 5/02; C22B 34/129; C22B 34/24; B22F 9/18; B22F 9/20; H01G 9/0525; H01G 9/0552

See application file for complete search history.

(56) References Cited

U.S. PATENT DOCUMENTS 6,115,235 A    9/2000   Naito
6,193,779 B1   2/2001   Reichert et al.
(Continued)

FOREIGN PATENT DOCUMENTS

CN    1247575    3/2000
CN    1650051    8/2005
(Continued)

*Primary Examiner* — Ciel Thomas
(74) *Attorney, Agent, or Firm* — Saliwanchik, Lloyd & Eisenschenk

(57) ABSTRACT

A method of producing metallic powder for use in the manufacture of a capacitor comprises the step of reducing a non-metallic compound to metal in contact with a molten salt. The salt comprises, for at least a portion of the process, a dopant element that acts as a sinter retardant in the metal. In preferred examples, the metallic powder is Ta or Nb powder produced by the reduction of a Ta or Nb oxide and the dopant is boron, nitrogen, or phosphorous.

6 Claims, 1 Drawing Sheet

(51) Int. Cl.
*C22B 5/02* (2006.01)
*C22B 34/12* (2006.01)
*C25C 3/26* (2006.01)
*C25C 5/04* (2006.01)
*H01G 9/052* (2006.01)

(56) References Cited

U.S. PATENT DOCUMENTS

| | | |
|---|---|---|
| 6,432,161 B1 | 8/2002 | Oda et al. |
| 6,689,187 B2 | 2/2004 | Oda |
| 6,712,952 B1 | 3/2004 | Fray et al. |
| 6,876,542 B2* | 4/2005 | Oda .................. B22F 1/0088 252/62.2 |
| 2004/0052672 A1* | 3/2004 | Fray et al. .................. 419/30 |
| 2004/0205947 A1 | 10/2004 | Oda et al. |
| 2006/0096418 A1* | 5/2006 | Tagusagawa ............ B22F 9/24 75/364 |
| 2007/0295609 A1 | 12/2007 | Jeong et al. |
| 2008/0254293 A1 | 10/2008 | Loffelholz et al. |
| 2009/0010833 A1* | 1/2009 | Rosenband et al. .......... 423/349 |
| 2009/0067121 A1* | 3/2009 | Mizusaki .............. B22F 1/0018 361/529 |

FOREIGN PATENT DOCUMENTS

| | | |
|---|---|---|
| CN | 1694973 | 11/2005 |
| EP | 0 665 302 | 8/1995 |
| JP | 2001-512530 | 8/2001 |
| JP | 2008-013793 | 1/2008 |
| WO | WO 99/64638 | 12/1999 |
| WO | WO 02/04152 | 1/2002 |
| WO | WO 03/076690 | 9/2003 |
| WO | WO-2004/042095 | 5/2004 |
| WO | WO-2006/062234 | 6/2006 |
| WO | WO 2008/041007 | 4/2008 |

* cited by examiner

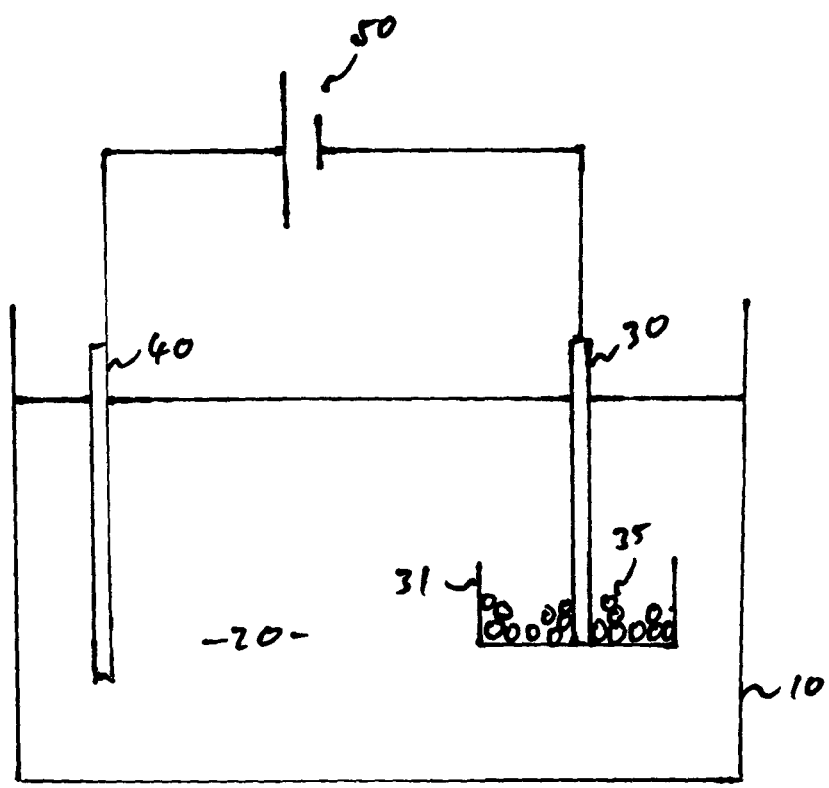

METHOD FOR PRODUCING METAL POWDERS

CROSS-REFERENCE TO RELATED APPLICATIONS

This present application is a divisional of U.S. application Ser. No. 13/201,135, filed Aug. 11, 2011, which is the National Stage of International Application Number PCT/GB2010/000266, filed Feb. 15, 2010, each of which is hereby incorporated by reference herein in its entirety, including any figures, tables, nucleic acid sequences, amino acid sequences, or drawings.

FIELD OF THE INVENTION

The present invention relates to a method for the production of metallic powders or sponges for use in the manufacture of capacitors, including production of tantalum, niobium and other Group 3, 4, 5 or 6 metals, or their alloys.

BACKGROUND TO THE INVENTION

Tantalum or niobium capacitors typically have small size and high capacitance, and have become vital components in cellular phones and personal computers. With the ever-increasing demand for higher performance, greater reliability and lower cost electronic components, there is a consequent demand for improved quality tantalum and/or niobium powder and more economical routes to production. Current production methods involve many steps and so are costly and quality control is difficult.

As an example, tantalum metal capacitor anodes are normally manufactured by compressing aggregated tantalum powder to a density value of less than half of the metal's true density (typically between 5 and 7.5 g·cm$^{-3}$ compared with the true density of Ta, which is 16.6 g·cm$^{-3}$), with an embedded anode lead wire, to form a porous pellet. The pellet is then sintered to form a porous body (i.e. an anode or anode body), and the porous body is anodised by impregnation with a suitable electrolyte to form a continuous dielectric oxide film on the tantalum surface. The anodized porous body is then impregnated with a cathode material to form a uniform cathode coating, connected to a cathode lead wire and encapsulated with a resin casing. Thus, the porous body must contain open, preferably uniform, pores in order to allow impregnation for the steps of anodizing and impregnation to form the dielectric film and the cathode.

Increasing the surface area (whilst maintaining an open, porous structure) of the aggregated tantalum powder used to form the anode may advantageously increase the capacitance of a tantalum capacitor. Therefore, it is desirable to form an anode body from a powder or agglomerate of powders that has a high surface area. During processing steps such as sintering, however, the surface area of the powder can be diminished and the porosity of the powder or agglomerate may be reduced. One solution to the loss of porosity and surface area of a capacitor powder during processing is to include a processing step to add a sinter retarding agent. Such an agent inhibits growth of grains during sintering and helps maintain the surface area and porosity of the precursor powder/agglomerate in the finished capacitor.

U.S. Pat. No. 6,193,779 discloses a method for producing tantalum powders by ignition of a mixture of tantalum pentachloride and alkaline earth hydrides, wherein the mixture optionally contains dopants which contain phosphorous and/or nitrogen (phosphorous and nitrogen being sinter retardants for tantalum).

SUMMARY OF INVENTION

The invention provides in its various aspects a method of producing a metal powder or sponge, in particular a tantalum (Ta) or niobium (Nb) powder or sponge, a metal powder or sponge, a system for the production of metal powder or sponge, and a capacitor as defined in the appended independent claims, to which reference should now be made. Preferred or advantageous features of the invention are defined in dependent sub-claims.

Accordingly, a first aspect may provide a method of producing metal powder or sponge for use in the manufacture of a capacitor comprising the steps of, reducing a precursor non-metallic compound to metal in contact with a molten salt, the salt comprising, for at least a portion of the process, a dopant that acts as a sinter retardant in the metal. Preferably the salt comprises between 50 ppm and 10000 ppm of the dopant, particularly preferably between 50 ppm and 5000 ppm of the dopant. The metal results in the metal powder or sponge comprising a concentration of the dopant. Unless otherwise noted, ppm in this application has the standard meaning of parts per million by weight.

Different dopants have different efficacy as sinter retardants. Thus, the level of dopant in the salt may be low for a dopant that has high efficacy, for example between 60 ppm and 400 ppm, preferably between 70 ppm and 200 ppm.

Where the compound is reduced by a continuous process, the level of dopant in the salt may be continuously refreshed, or the total mass of salt in the system may exceed the mass of the compound being reduced by such a degree that the dopant levels remain effectively constant during the reaction. The same may be true where the process is a batch process but the mass of salt used in the reaction is sufficiently greater than the mass of compound being reduced.

Where the reduction is performed as a batch reaction and the ratio of mass of salt in the system to mass of compound being reduced is low, then the concentration of dopant in the salt may decrease as the reaction proceeds and dopant is consumed by the compound/reduced metal. In such circumstances the initial concentration of dopant may need to be high in order to provide the desired dopant level in the reduced metal. Alternatively, additional dopant may be added during the reaction if this is required. However the dopant level in the salt is controlled, the dopant level in the reduced metal needs to be sufficient to act as a sinter retardant in the metal.

Preferred metals to be produced by the method are Ta or Nb powders or sponges, and it is preferred that the non-metallic compound is a non-metallic compound substantially comprising Ta or Nb, or a compound capable of being reduced to Ta or Nb in a molten salt. Alternatively, any metal that is suitable for use as a capacitor, for example a metal from group 3, 4, 5, or 6 of the periodic table, may be produced by the method.

The precursor non-metallic compound is preferably a solid compound and may be in the form of powder particles or agglomerates or may, alternatively, be in the form of a porous preform or pellet constructed from a powder or agglomerates. Such a preform may be produced by any known means, for example by pressing powder or by extrusion. A preform, if used, may be sintered to provide it with sufficient strength for subsequent processing.

The presence of a dopant in the molten salt for at least a portion of the process may advantageously result in the reduced metal comprising the dopant at sufficient levels for the dopant to act as a sinter retarding agent. This is advantageous if the metal is produced in powder form as grain growth may then be retarded during subsequent processing. If the metal is produced in the form of a sponge, the presence of sinter retarding agents may still help maintain a high surface area during subsequent operations such as deoxidation of the bulk metal or anodising to coat the surface area of the sponge with a dielectric oxide.

Reduction of the compound may occur chemically or electrically, for example as described in WO99/64638 or WO03/076690. Preferably, a cathode and an anode are arranged in contact with the molten salt and the compound is arranged to be in contact with the cathode, the method then comprising the further step of applying a sufficient potential between the cathode and the anode for the compound to reduce to metal.

Advantageously, the non-metallic compound may comprise oxygen and the reduction to metal may then occur by electro-deoxidation. The process of electro-deoxidation is described in WO 99/64638. Under the process of electro-deoxidation the cell voltage is preferably maintained at a potential that is sufficient to remove oxygen from the cathode, or the compound in contact with the cathode, but is not sufficient to cause cations in the electrolyte to deposit as metal at the cathode.

Preferably the molten salt comprises one or more elements selected from the group comprising barium, calcium, caesium, lithium, sodium, potassium, magnesium, strontium and yttrium. Particularly preferably, the molten salt comprises a metal halide, and preferably comprises calcium chloride.

The dopant may be any sinter retardant element or may be a combination of sinter retarding elements, or a combination of elements that have a combined sinter retarding effect in the reduced metal. Preferably the salt is produced by adding a predetermined amount of a dopant element, or dopant elements, to a salt, preferably a high purity grade salt.

The dopant may be present in the salt during the entire process, which may advantageously simplify processing. The dopant may not be present in the molten salt in sufficient amount to affect the reduction of the compound to metal but is present in sufficient amount to react with, or diffuse into the reduced metal.

It may be advantageous, however, to add the dopant to the salt during the final stages of the process, for example as the reduction is completing or after the reduction to metal has taken place. Dopant could be added in a suitable form (i.e. elemental or as part of a compound that dissolves or breaks down in the molten salt) to the molten salt, or the molten salt could be replaced with a new salt containing the required levels of dopant. Dopant may be added to the salt in higher amounts when only present in the final stages of the process than would be desirable if present throughout the process.

Control of when dopant is added to the molten salt may facilitate control of dopant level in the reduced metal.

Optionally the dopant, in elemental form or as part of a compound containing the dopant element, may be mixed with the compound for introduction into the molten salt. It is likely that the dopant in this case would subsequently dissolve in the salt. For example, a preform or pellet may be formed from a mixture of a metal oxide and a boron, nitrogen or phosphorous containing compound and this preform may then be introduced into the molten salt. The boron, nitrogen or phosphorous containing compound may then dissolve into the molten salt to provide a dopant concentration of boron or phosphorous in the salt.

The dopant should be an element that acts on the metal to inhibit sintering in the metal. For Ta and Nb suitable dopants may include boron, nitrogen, and phosphorous. Nitrogen has the additional advantage that it increases layer ignition temperature in Ta. The method is particularly advantageous for doping a metal with boron and/or phosphorous.

A second aspect may provide a system for the production of metallic powder or sponge by reduction of a non-metallic compound comprising an electrolytic cell having an anode and a cathode, and an alkali metal salt or alkaline earth salt, the salt comprising between 10 and 10000 ppm of an element that acts as a sinter retarding dopant in the metallic powder. Particularly preferably, the salt comprises between 50 ppm and 5000 ppm of the dopant. Preferably the dopant is boron, phosphorous, or nitrogen.

Preferably the system is for use in the production of Ta or Nb powder or sponge, particularly preferably for the deoxidation of a Ta or Nb oxide to form a sinter retardant Ta or Nb powder. The level of dopant in the salt should be sufficient to produce a sinter-retardant effect in the powder.

Preferably, the ratio of salt to non-metallic compound is sufficiently high that there is minimal depletion of dopant in the salt during the process, for example if the ratio (by mass) is greater than 15:1, or 20:1, preferably greater than 25:1 or 40:1.

Advantageously, the system may be used in any method described above or for the production of any powder described below.

A third aspect may provide a salt for use with a method or system described above or for the production of a powder as described above. Such a salt contains between 10 ppm and 10000 ppm of a dopant element, preferably between 50 ppm and 5000 ppm, for example between 60 ppm and 500 ppm or between 70 ppm and 200 ppm of a dopant element, depending on the molten salt to reactant mass ratio. Preferably the dopant is a dopant element from the group comprising boron, phosphorous and nitrogen. The salt may be an alkali metal salt or an alkaline earth salt, preferably a halide salt.

Preferably, doping levels of the salt are controlled by adding a dopant composition or dopant alloy to the salt to increase the proportion of the dopant element to the desired level.

Preferably the salt is a $CaCl_2$ salt comprising a dopant selected from the group comprising boron, phosphorous and nitrogen. Optionally, such a $CaCl_2$ salt may comprise CaO, for example between 0.1 wt % and 0.8 wt % CaO.

A fourth aspect provides an alternative method of producing metallic powder or sponge for use in the manufacture of a capacitor comprising the steps of, selecting a non-metallic compound capable of reduction to the metallic powder or sponge, and reducing the non-metallic compound to metal in contact with a molten salt. Before being reduced, the non-metallic compound comprises between 50 ppm and 10000 ppm of a dopant that acts as a sinter retardant in the metal, for example up to 7000 ppm or 8000 ppm of the dopant.

Preferably, the compound has dopant levels of between 50 ppm and 5000 ppm, for example between 100 ppm and 300 ppm or between 200 ppm and 500 ppm or between 250 ppm and 1000 ppm. The dopant levels in the compound may vary depending on the concentration of dopant required in the reduced metal. For example, preferred phosphorous levels in the compound may be between 50 ppm and 500 ppm, whereas preferred nitrogen and boron levels may be between 50 ppm and 10000 ppm.

Some dopant elements may be removed from the compound during its reduction to metal. Thus, it may be advantageous for the dopant concentration in the compound prior to reduction to be greater than the dopant concentration needed in the metal to provide a sinter retardant effect.

Preferably the dopant is one or more of boron, phosphorous or nitrogen. Where the dopant is nitrogen, it may be advantageous to select a compound containing between 100 and 10000 ppm of nitrogen, or dope the compound to provide a nitrogen level of between 100 and 10000 ppm, in order to obtain a nitrogen level of between 50 and 5000 ppm, for example about 250 ppm, in the reduced metal product.

The compound may be reduced in the form of powder or agglomerated powder. Alternatively, the compound may be shaped into a preform or pellet by a known route prior to being reduced.

It may be advantageous for the dopant concentration in the non-metallic compound to be determined and then a doping process or reaction performed in order to increase the dopant concentration in the compound to desired levels.

Where the non-metallic compound is shaped into a preform or pellet prior to reduction, a doping process to increase the dopant concentration in the compound may occur before or after producing the preform.

A predetermined dopant level may be achieved in the compound by controlling processing steps during the formation of the non-metallic compound, for example nitrogen levels in $Ta_2O_5$ may be controlled within predetermined limits by controlling process steps during the formation of $Ta_2O_5$.

Alternatively, a doping process may occur by reacting the non-metallic compound with a solid, liquid or gas consisting of or comprising the dopant. For example, the compound may be treated at an elevated temperature in a nitrogen atmosphere in order to diffuse nitrogen into the compound as a dopant. As a further example, the compound may be treated with phosphoric acid in order to provide phosphorous doping.

It is preferable that the non-metallic compound comprises oxygen, for example the compound may be a metal oxide. An advantageous method of reducing the compound may be by using the FFC Cambridge electro-deoxidation process.

A fifth aspect may provide a metal powder, in particular a tantalum or niobium powder, for the production of capacitors comprising porous particles or agglomerates having a mean particle size of between 5 µm and 500 µm and a specific surface area of between 0.1 and 10 $m^2/g$ when measured by the BET method, characterised in that the particles comprise between 5 and 5000 ppm of a sinter retarding dopant, for example between 10 and 2000 ppm, or 20 and 1000 ppm.

Preferably the powder comprises between 15 and 500 ppm or between 20 and 250 ppm of a sinter retarding dopant. Preferably the powder comprises between 45 and 200 ppm of a sinter retarding dopant, particularly preferably between 50 and 100 ppm of a sinter retarding dopant. Advantageously the sinter retarding dopant is one or more element selected from the group comprising boron, nitrogen, and phosphorous.

A powder according to this second aspect may be capable of undergoing any process steps required to produce a capacitor grade powder, such as deoxidation, without a significant increase in the powder grain size or a significant decrease in the specific surface area. The powder may also resist a decrease in surface area when undergoing any further sintering steps required to form a capacitor.

A sixth aspect may provide a capacitor anode or anode body, the anode having a specific surface area of between 0.1 and 10 $m^2/g$, preferably between 0.1 and 5 $m^2/g$, when measured by BET (Micromeritics Tristar) and between 10 and 2000 ppm of a dopant, where the dopant is an element selected from the group comprising nitrogen, phosphorous and boron. Preferably the anode is formed from Ta or Nb, and preferably the anode is formed by sintering Ta or Nb powder or agglomerates. The anode production may include manufacture of powder by any method described above or use of any powder described above.

DESCRIPTION OF SPECIFIC EMBODIMENTS OF THE INVENTION

Specific embodiments of the invention will now be described by way of examples, with reference to the accompanying drawing, in which;

FIG. 1 illustrates an electro-reduction apparatus for performing a method according to an aspect of the invention.

EXAMPLE 1

A first example describes the production of boron-doped Ta powder by direct electro-deoxidation of $Ta_2O_5$. A schematic of the apparatus used in the method is illustrated in FIG. 1.

The apparatus used comprised a container or crucible 10 filled with a salt 20. The salt was a calcium chloride salt. The salt further comprised about 50 ppm boron.

Heating elements (not shown) acted to raise the temperature of the salt to above its melting point. A cathode 30 and a carbon anode 40 were then arranged in the molten salt and connected via a power supply 50.

$Ta_2O_5$ powder was formed into precursor agglomerates by a process of pressing and sintering. These precursor agglomerates may alternatively be described as preforms, particles or pellets.

The agglomerates of $Ta_2O_5$ (the precursor material) 35 were arranged in contact with the cathode 30. This contact was achieved by placing the agglomerates within a basket 31 that forms part of the cathode 30. Contact between agglomerates and cathode could be achieved by any other suitable means including, for example, placing the agglomerates on the surface of a plate that is part of, or in contact with, the cathode, or by threading agglomerates onto a rod or wire that is electrically coupled to the cathode.

As part of a pre-processing protocol, the temperature of the salt was first raised to 400° C. for 16 hours to dry the salt and then further raised to 920° C. It is understood, however, that any suitable pre-processing protocol may be used to prepare a salt for use in a method according to the invention.

Electro-deoxidation was performed on the $Ta_2O_5$ agglomerates 35 such that they were reduced to metallic Ta. This electro-deoxidation was performed according to the Cambridge FFC process (described in WO 99/64638). A voltage of 2.8 V was applied across the cell terminals (30, 40) for 56 hours to ensure the complete reduction of the oxide to Ta metal. The cathode 30 with its associated basket 31 containing reduced metal was then withdrawn from the molten salt under an argon blanket and allowed to cool.

The cathode and reduced metal were rinsed in water to remove excess salt and then the metal was thoroughly washed first in hot deionised water (80° C.) and then in 1M HCL acid to remove the salt and calcium oxide. After drying, capacitor grade Ta powder was obtained. The resulting powder had a boron content of 250 ppm, a specific surface area of about 1 $m^2/g$ and a specific charge of about $50 \times 10^3$ µF·V/g (CV/g)

The resulting powder could then be processed via a known route to produce a capacitor. A typical example of a capacitor production route is described above in the background to the invention.

EXAMPLE 2

A second example describes the production of phosphorous-doped Ta powder by direct electro-deoxidation of $Ta_2O_5$.

$Ta_2O_5$ pellets were produced by pressing $Ta_2O_5$ powder and then sintering, such that the pellets had sufficient strength to be handled and a porosity of about 60 to 65%. The sintering temperature and time required to achieve these criteria will vary, depending on the particular sinter characteristics of the batch of $Ta_2O_5$ powder being used.

An apparatus substantially as described above in relation to Example 1 (and illustrated in FIG. 1) was used to reduce the pellets. The electro-deoxidation reaction was performed in a phosphorous-doped molten salt, however, rather than the boron-doped salt used for Example 1.

A phosphorous-doped calcium chloride salt was produced by adding 1000 ppm by weight of calcium phosphate $(Ca_3(PO_4)_2)$ to LP grade $CaCl_2$. The level of calcium oxide (CaO) in the salt was adjusted to be about 4000 ppm by weight. The ratio of the mass of salt in the cell to mass of oxide being reduced was approximately 36:1.

Before use, the doped calcium chloride salt underwent a pre-processing protocol to dry the salt as described above in relation to Example 1. Any suitable salt pre-processing protocol may be used to prepare the salt for use.

An electro-deoxidation of the $Ta_2O_5$ pellets was performed by applying a voltage of about 3 V between the anode and cathode for a period of 24 hours, such that the $Ta_2O_5$ pellets were reduced to metallic Ta. The temperature of the salt was maintained at about 830° C. for the duration of the electro-deoxidation reaction.

The cell was then cooled and the reduced metal removed and washed to remove excess salt. The resulting Ta metal was analysed and found to contain 484 ppm phosphorous (ICP-MS).

EXAMPLE 3

A third example describes the production of phosphorous-doped Ta powder by direct electro-deoxidation of $Ta_2O_5$.

The apparatus and electro-deoxidation method used in Example 3 were substantially the same as described for Example 2, with the one difference that the salt was doped with higher levels of phosphorous.

The salt for use in this third example was produced by adding about 3000 ppm by weight of calcium phosphate to LP grade calcium chloride salt. The total CaO content of the salt was adjusted to be about 4000 ppm by weight. The ratio of the mass of salt in the cell to mass of oxide being reduced was approximately 36:1.

$Ta_2O_5$ pellets were reduced at a potential of about 3V for a period of 24 hours. The resulting Ta metal was analysed and found to have a phosphorous content of 1400 ppm.

EXAMPLE 4

A fourth example describes the production of nitrogen-doped Ta powder by direct electro-deoxidation of nitrogen-doped $Ta_2O_5$. The apparatus used was substantially as described above in relation to Example 1. The molten salt used was a $CaCl_2$ salt having 0.4 wt % CaO.

$Ta_2O_5$ powder having a nitrogen content of 783 ppm (as measured by an Eltra ON900 nitrogen analyser) was selected, pressed into pellets and sintered. The pellets were placed in the apparatus and electro-deoxidation of the pellets was performed by applying a voltage of about 3 V between the anode and cathode for a period of 24 hours, such that the pellets were reduced to metallic Ta. The temperature of the salt was maintained at about 830° C. for the duration of the electro-deoxidation reaction. The resulting metal powder was analysed and found to contain 252 ppm of nitrogen.

We claim:

1. A method of producing metallic powder or sponge for use in the manufacture of a capacitor comprising the steps of:
    selecting a non-metallic compound capable of reduction to the metallic powder or sponge, and
    reducing the non-metallic compound to metal in contact with a molten salt, wherein the non-metallic compound is arranged to be in contact with a cathode in an electrolysis cell, the cell further comprising an anode and the molten salt, wherein a sufficient potential is applied between the anode and the cathode to reduce the non-metallic compound to metal; and wherein the non-metallic compound comprises oxygen and the reaction occurs by electro-deoxidation,
    wherein, before reduction of the selected non-metallic compound, the selected non-metallic compound comprises between 50 ppm and 10000 ppm of a dopant that acts as a sinter retardant in the metal.

2. The method according to claim 1, wherein the selected non-metallic compound is doped with between 50 ppm and 5000 ppm of the sinter retardant dopant prior to reduction to the metallic powder or sponge.

3. The method according to claim 1, wherein the selected non-metallic compound is doped by reaction with a solid, liquid or gas comprising the dopant, such that the dopant diffuses into the compound.

4. The method according to claim 1, wherein the dopant is boron, phosphorous, or nitrogen.

5. A method of producing metallic niobium or tantalum powder for use in the manufacture of a capacitor comprising the steps of:
    selecting a non-metallic niobium or tantalum compound capable of reduction to metallic niobium or tantalum, and
    reducing the non-metallic niobium or tantalum compound to metallic niobium or tantalum powder in contact with a molten salt,
    wherein the non-metallic niobium or tantalum compound is arranged to be in contact with a cathode in an electrolysis cell, the electrolysis cell further comprising an anode and the molten salt, wherein a sufficient potential is applied between the anode and the cathode to reduce the non-metallic niobium or tantalum compound to metallic niobium or tantalum powder,
    wherein, prior to reduction of the selected non-metallic niobium or tantalum compound, the selected non-metallic niobium or tantalum compound is doped with between 50 ppm and 5000 ppm of a dopant that acts as a sinter retardant in the metallic niobium or tantalum powder.

6. A method of producing metallic niobium or tantalum powder for use in the manufacture of a capacitor comprising the steps of:

selecting a niobium or tantalum oxide capable of reduction to metallic niobium or tantalum, and reducing the niobium or tantalum oxide to metallic niobium or tantalum powder in contact with a molten salt, wherein the niobium or tantalum oxide is arranged to be in contact with a cathode in an electrolysis cell, the electrolysis cell further comprising an anode and the molten salt, wherein a sufficient potential is applied between the anode and the cathode to reduce the niobium or tantalum oxide to metallic niobium or tantalum powder, wherein, prior to reduction of the selected niobium or tantalum oxide, the selected niobium or tantalum oxide is doped with between 50 ppm and 5000 ppm of boron, phosphorous, or nitrogen, the boron, phosphorous, or nitrogen being a dopant that acts as a sinter retardant in the metallic niobium or tantalum powder.

* * * * *